Feb. 21, 1933.　　　　B. H. FOSTER　　　　1,898,043

FORM FOR MANUFACTURE OF RUBBER ARTICLES AND PROCESS OF MAKING SAME

Filed Dec. 28, 1928

INVENTOR
Boutwell H. Foster
BY
　　　　ATTORNEY

Patented Feb. 21, 1933

1,898,043

UNITED STATES PATENT OFFICE

BOUTWELL H. FOSTER, OF MAPLEWOOD, NEW JERSEY, ASSIGNOR TO MORGAN & WRIGHT, OF DETROIT, MICHIGAN, A CORPORATION OF MICHIGAN

FORM FOR MANUFACTURE OF RUBBER ARTICLES AND PROCESS OF MAKING SAME

Application filed December 28, 1928. Serial No. 329,054.

This invention relates to a new and improved form for the manufacture of articles directly from aqueous dispersions of rubber or the like, such as rubber latex, and to a new and improved process for the manufacture of such forms.

The invention aims to provide a form which is more durable, less expensive, and more satisfactory than forms heretofore proposed for this purpose. It further aims to provide a form which may be made by a simple method and one which insures a uniform product. It further aims to provide a form by which a deposit of rubber from latex for instance may be built up to more nearly uniform wall thickness. These and other objects of the invention will be apparent from the following detailed description.

Without intention to limit more than is required by the prior art and with the preferred illustrated embodiments in mind, the invention consists in shrinking fabric with a solution of caustic soda or caustic potash on a mandrel or base member of metal or other form retentive material so as to make the woven fabric conform snugly to the contour of the mandrel or base member and without substantially any wrinkles. Preferably a filtering material, such as a suspension of celite, is applied to the face of the shrunk fabric on which the article is subsequently to be formed, but any suitable finely divided material which will form a surface smooth enough for the article to be made may be used for this filtering stratum.

In the accompanying drawing embodiments of the invention are illustrated in which.

Figure 1:
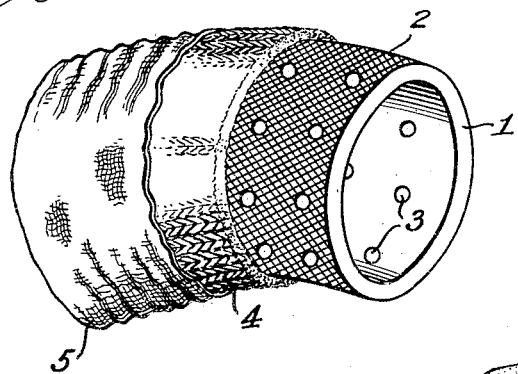
Fig. 1 is a perspective of an arcuate section of a form for the manufacture of inner tubes showing a woven fabric sleeve before shrinkage.
Figure 2:
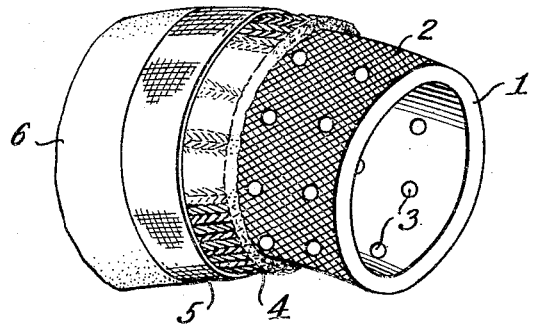
Fig. 2 is a similar view after the woven fabric sleeve has been shrunk to position.

In the drawing the invention is shown applied to a curved form suitable for the deposition of rubber from latex (natural or artificial) but it is to be understood that the invention may be applied to forms of other shapes for the manufacture of various articles, and that the form for the manufacture of inner tubes is merely typical. In Figs. 1 and 2 of the drawing the mandrel 1 is shown of curved shape, nearly circular, and tubular in cross section, such a mandrel as may be conveniently used in the manufacture of inner tubes which after completion may have their ends united by splicing. The mandrel 1 is preferably provided with a knurled, i. e. corrugated, surface 2 and a plurality of apertures 3 of a size and spacing approximately as illustrated, the knurling and the apertures facilitating the flow of liquid to the interior of the mandrel 1. For some purposes the knurling may be omitted. Optionally, the mandrel 1 may be covered with a knit stocking 4 which is fitted snugly thereto to stretching the goods thereover. A cylindrical woven cotton sleeve 5 is then fitted over the knitted stocking 4, this sleeve being of a slightly greater circumference than the mandrel (10¼" as compared with 9¾"). The ends of the woven sleeve 5 may be secured to the mandrel 1 in any suitable and convenient manner as for instance by taping (not shown). The assemblage is then immersed for about 4 min. in a solution of caustic soda—a 20% solution in water at room temperature is satisfactory. However, solutions of other materials which are capable of shrinking the woven sleeve and solutions of greater or less strength and either hot or cold may also be used with more or less advantage. Generally the length of time the woven sleeve is subjected to the shrinking solution depends upon the temperature and strength thereof. After shrinking treatment the woven sleeve may be washed in order to remove the excess alkali (or other shrinking agent) and if desired after washing any residual alkali may be neutralized by treating with a weak acid solution. Washing alone, however, is preferred. Threads or other formations on the mandrel 1, which is preferably of metal such as aluminum, may be protected in any convenient manner such as by coating with paraffin previous to the immersion of the mandrel in the shrinking solution.

The form thus built up by shrinking the woven sleeve 5 thereon is then preferably surfaced with a filtering medium 6, as by immersion in a 15% suspension of celite or by submersion in any other suitable suspension of finely divided material. If a suspension of celite is employed for the filtering stratum 6, this may conveniently be applied by immersing the assemblage in the suspension for less than a minute, for instance, while a vacuum is maintained on the interior of the mandrel 1.

Figure 3:
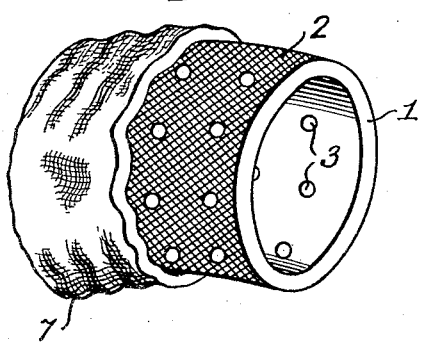
Fig. 3 is a view similar to Fig. 1 of a modification showing the woven fabric sleeve before shrinkage.
Figure 4:
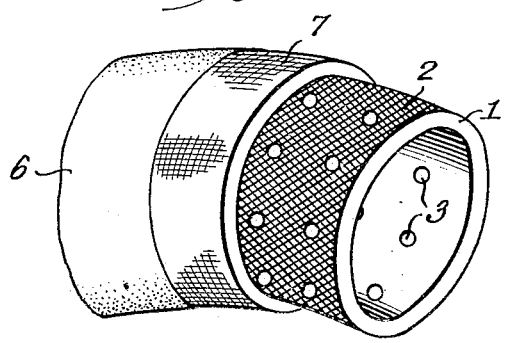
Fig. 4 is a view similar to Fig. 3 after the woven sleeve has been shrunk.

In Figs. 3 and 4 another and preferred form of the invention is illustrated in which the knit stocking 4 of Figs. 1 and 2 is omitted and a cylindrical woven sleeve 7 of somewhat greater thickness employed alone and shrunk directly on to the mandrel 1.

While the cylindrical woven sleeves 5 or 7 may be variously fabricated, one having a weight of 7¼ ounces to the square yard and a count of approximately 42 warp by 30 picks from a cotton thread made of three strands of yarn having a weight of 23 hanks and a length of 840 yards each to one pound has been found satisfactory. A circular woven sleeve of such material is shrunk satisfactorily upon immersion for 3 minutes in a moderately warm 30% solution of caustic soda. These figures however, are merely illustrative as the fabric may have any desired mesh and be made of any desired thread or yarn. It is preferably woven tubular but for some purposes may be formed tubular by uniting the sides of a piece of fabric, as for instance, by stitching.

With forms of the construction above described in detail, inner tubes may be manufactured by completely immersing the form in a dispersion of rubber such as latex (natural or artificial and compounded or uncompounded) and by applying a differential of pressure, as for instance a vacuum to the interior of the mandrel 1 to accelerate the passage of the liquid phase of the dispersion through the filtering stratum 6 and the shrunk fabric sleeve to the corrugated face of the mandrel 1 and thence through the apertures 3. After a sufficiently thick deposit of rubber has been formed on the mandrel the form is removed, the fittings or surfaces, which are coated with rubber not desired as parts of the article to be made, are washed clean so as to free them from such rubber and also to economize in the manufacture, and then the deposit is nearly completely dried with the vacuum still on the interior of the mandrel, and finally the tube or other article is vulcanized by subjection to a suitable temperature for a suitable length of time depending of course on the composition of the deposit. After vulcanization the tube is allowed to stand and then stripped from the form.

A form constructed according to the present invention not only has more uniform walls which permit a more uniform deposition of rubber from aqueous dispersions, but also is more durable. It is frequently desirable to remove and/or renew the filtering surface 6 which is in direct contact with the aqueous dispersion of rubber, and shrunk tubular sleeves 7 more or less tightly hugging the mandrel or base permit of the necessary treatment incident to such removal of renewal with less likelihood of wrinkling or loosening.

While the invention has been particularly described with reference to the manufacture of inner tubes, it is of course to be understood that it is not confined to the manufacture of such articles and comprehends the manufacture of any shape or form to which it is applicable. For shrinking the woven sleeve any material capable of causing the sleeve to contract and snugly embrace a base member such as 1 may be employed. The fabric sleeves 5 and 7 are preferably formed tubular by weaving on a cylindrical machine but may be made in any suitable and convenient manner. Reference should therefore be made to the accompanying claims for an understanding of the scope of the invention.

Having thus described my invention, what I claim and desire to protect by Letters Patent is:

1. A form for manufacturing rubber articles by filtration comprising a base member constructed and arranged to permit fluid flow, a sleeve of an original slightly larger size shrunk snugly and smoothly on said base member and a coat of filtering material over said sleeve upon which rubber may be deposited by filtration.

2. A form upon which rubber articles may be manufactured by filtration comprising a rigid member having the shape of the article to be manufactured, a sleeve of fibrous material of an original slightly larger size shrunk snugly and smoothly on the rigid member, and a filtering medium on the sleeve.

3. A form upon which rubber articles may be manufactured by filtration comprising a base member having the shape of the article to be manufactured, a jacket chemically shrunk on the base member, and a filtering composition on the jacket.

4. A form upon which rubber articles may be manufactured by filtration comprising a non-rectilinear base member having the shape of the article to be manufactured, a jacket over the base member consisting of a single piece of fabric which conforms to the contours of the base member and which presents a smooth surface, and filtering material over the jacket.

5. A form upon which rubber articles may be manufactured by filtration comprising a non-rectilinear base member having the shape of the article to be manufactured and adapted to permit the flow of fluids therethrough, a jacket of seamless fabric which surrounds the base member and conforms thereto without wrinkles, and a filtering composition on the jacket.

6. A form upon which rubber articles may be manufactured by filtration comprising a non-rectilinear base member having channels and apertures therein adapted to permit fluid flow, a seamless sleeve of woven fabric on the base member which conforms to the base member and presents a smooth surface, and a filtering medium on the sleeve.

7. A form upon which rubber articles may be manufactured by filtration comprising a curved tubular base member constructed and arranged to permit fluid flow, a seamless sleeve of woven fabric shrunk on said base member, and filtering composition on the sleeve.

8. A form upon which rubber articles may be manufactured by filtration comprising a curved tubular mandrel having channels along the surface thereof and apertures therethrough, a sleeve of woven fabric which fits over the mandrel and conforms to the contours thereof so as to present a smooth surface, and filtering composition on the sleeve.

9. A form upon which rubber articles may be manufactured by filtration comprising a circular tubular mandrel having a channeled surface and apertures therethrough, a seamless sleeve of woven fabric disposed over the mandrel and conforming to the contours thereof so as to present a smooth surface, and a filtering medium thereover.

10. In the process of making a form upon which rubber articles may be formed by filtration, the steps of covering a base with a sleeve of woven fabric, treating the fabric with an alkaline solution to cause the sleeve to shrink so as to closely conform to the contours of the base member.

11. In the process of making a form upon which rubber articles may be formed by filtration, the steps of stretching a sleeve of woven fabric over a circular tubular base member, treating the fabric with an alkaline solution to cause the sleeve to shrink into close conformity with the contours of the base member, and removing the excess alkali.

12. In the process of making a form upon which rubber articles may be formed by filtration, the steps of enclosing a circular tubular base member in a sleeve of woven fabric, dipping the fabric covered base member into an alkaline solution, and washing the excess alkali from the fabric and base member.

Signed at New York, county of New York, State of New York, this 27th day of December, 1928.

BOUTWELL H. FOSTER.